May 16, 1933.	G. BROWNING	1,908,683
ELECTRIC TOASTER
Filed April 30, 1930	4 Sheets-Sheet 1

Fig. 1.

Witness.
H.T. McKnight

Inventor.
George Browning.
by Burton & Burton
his Attorneys.

Patented May 16, 1933

1,908,683

UNITED STATES PATENT OFFICE

GEORGE BROWNING, OF WILMETTE, ILLINOIS, ASSIGNOR TO CHICAGO FLEXIBLE SHAFT COMPANY, OF CHICAGO, ILLINOIS, A CORPORATION OF ILLINOIS

ELECTRIC TOASTER

Application filed April 30, 1930. Serial No. 448,529.

The purpose of this invention is to provide an improved construction of an electrically energized heat treatment device,—such as a toaster or other cooking utensil,—in which the heat treatment period is automatically controlled according to the temperature of the heat element, a specific purpose being to make the rate of rise of temperature an element, in conjunction with the absolute temperature, in such automatic control. It consists in the elements and features of construction shown and described as indicated in the claims.

The particular apparatus selected for embodying and illustrating the invention is an electric toaster; but it may be understood that the invention is not limited to this class of devices, nor even broadly to cooking implements; but, on the contrary, it may be embodied in any apparatus for any purpose in which the duration of the heating period is to be automatically determined by the heating results, so as to shorten the period when the temperature is higher and lengthen it when it is lower.

The drawings show a toaster of the type characterized by having a support for the slice to be treated, whether bread or other material, arranged for supporting the slice between the heat-radiating elements, hereinafter referred to as heat units, which are electrically heated by a current in a circuit controlled by circuit-interrupting means which is operated for opening the circuit by a thermostatic device which is exposed to the heat of a heat unit, and is flexed by rise of temperature due to its exposure to the heat unit; and at a predetermined degree of such rise the movement of the free end of the thermostatic member which results from the flexure, causes it to encounter and operate means for opening the circuit, and also means for releasing the slice and causing it to be removed from heat-treatment position. When the user, as soon as one slice is fully toasted and the energizing circuit is interrupted, promptly replaces the toasted slice with a fresh slice, the heat units and the adjacent parts of the structure having slight opportunity to become cooled in the negligible interval between toasting operations, and so having a slightly higher temperature at the beginning of the second, and still higher at the beginning of the third, than at the beginning of the first, it occurs that the period required for a given degree of toasting is shortened at each successive operation for at least three or four repetitions; so that while the first slice requires perhaps three minutes for complete toasting the second slice will require only two and one-half minutes, and the third only two minutes. And if the apparatus is controlled by a strictly timing device, even though such device is itself controlled by the temperature, the control of the timer must be adjusted at each toasting operation according to the number of such operations which have preceded without substantial cooling intervals. Otherwise, each succeeding slice up to some limit, as the third or fourth, will be over-toasted as compared with the preceding slices.

In the construction shown in the drawings this defect is avoided by providing thermostatic elements in plurality, arranged so as to be substituted one for another in alternation (or in endless series if more than two) in the successive heat treatment operations, each, after serving in a heat treatment, being moved out of exposure to the heat units, and thus having opportunity to become cool during the interval before it comes into service again.

It results that if, by reason of almost negligible intervals permitted between successive heat treatments, the heat element is hotter at each succeeding instance of exposure of the slice to be heat treated, thermostatic elements coming into service successively at the same temperature will be heated to the degree for operating the circuit-interrupting and slice-exposing means correspondingly sooner as the heat of the heat element is greater; and thus the heat treatment period will be shortened as the heat element becomes hotter and capable of effecting the heat treatment in shorter time.

Figure 5:
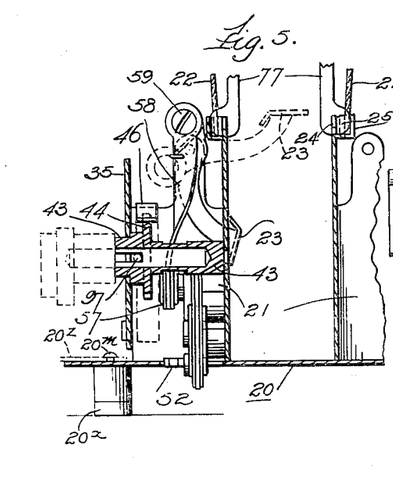
Figure 5 is a section at the line 5—5 on Figure 3.

Referring to the drawings:

Upon a base plate, 20, there are mounted in upright position parallel supports, 21, 21, for heat units, 22, 22, which are lodged on the upper edges of the supports respectively, the latter being formed at their upper edges for such lodgment by means of lugs, 24, 25, alternating at opposite sides of the position of the heat element, the lugs, 25, at one side being struck off laterally and flexed upwardly so as to afford by the lateral off-struck part the lodgement for the heat element. Mounted pivotally on one of the uprights, 21, there is provided a slice support, 23. This slice support is arranged to be releasably held at slice-supporting position seen in Figure 1 by means hereinafter described, and to be swung down out of slice-supporting position as seen in Figure 5 when released.

For this purpose one of the pivot arms of the slice support, 23, is furnished at its pivot with a pinion, 26; and there is mounted on the upright, 21, most conveniently by pivoting thereto, as seen at 27, near the opposite end of the upright, a latch bar, 28, having at its free end remote from the pivot a rack, 30, meshing with the pinion, 26, at the proper side of the pinion for rotating the same in the direction for swinging the slice support, 23, up to slice-supporting position by the upward movement of the latch bar, or for being thrust upward by the rotation of the pinion in the direction for swinging the latch bar upward at the rack-carrying end. And there is provided, pivoted on a support fixed with respect to the upright, 21,—as illustrated on the outer wall plate, 35, of the housing for the operating mechanism, of which housing the upright, 21, forms the inner wall plate,—a bell crank trip lever, 31, whose depending arm, 32, has a catch nose, 33, arranged for engaging a catch lug, 34, with which the latch bar, 28, is furnished, when the swinging of the slice support, 23, to slice-supporting position causes the pinion to operate the latch bar for carrying the lug, 34, up past the catch nose so as to be engaged thereabove, upon the bell crank lever swinging by gravity to carry its depending arm into position for such engagement.

For releasing the catch lug from the latch, and thereby causing the slice support, 23, to drop and lower the slice from heat treatment position between the heat elements after a predetermined period of exposure to the heat treatment, there is provided mounted in the inner and outer walls of the mechanism housing,—comprising, as mentioned, the upright, 21, constituting the inner wall, and a parallel upright plate, 35, constituting the outer wall,—a shaft, 36, having a plurality of radial arms or spokes, 37,—as illustrated, three in number,—each of which has rigid with it at the outer end and extending in a plane transaxial with respect to the shaft, a thermostatic bar, 40; that is to say, a bimetallic bar adapted to be flexed by change of temperature, causing its free end to move toward and from the shaft, the inner lamina of the bar being of metal having the higher co-efficient of expansion by heat; so that increased temperature causes the free end of the bar to move away from the shaft, and when properly positioned as hereinafter described, so as to extend directly below and terminate proximate to the horizontal arm of the trip lever, 31, to encounter the latter and lift it, releasing the latch bar, 28, and permitting the slice support, 23, to fall.

The shaft, 36, is exposed at the outside of the wall plate, 35, and may be provided with a knob or key as hereinafter described for operating it to rotate the system of thermostatic bars to bring any selected one to position described for acting on the trip lever in the manner described when said thermostatic bar is heated to the predetermined degree necessary to flex its free end up against the trip lever.

For properly positioning the thermostat piston, causing the rotation of the shaft to be halted at the proper point, and also to be completed automatically to such point when the operator has turned it a short angular distance from a previous position of adjustment, there is provided fast on the shaft, 36, a polygonal cam, 41, corresponding in the number of its sides to the number of thermostatic bars of the system carried by the shaft, and accordingly, in the structure, as shown, triangular, which cooperates with a lever, 38, stressed by a spring, 39, against the edge of the cam plate, and thereby operating for rotating the plate and the shaft when the shaft has been turned to position having one of the flat edges of the triangular plate at an acute angle to the edge of the lever, and halting the rotation when the lever edge rests flatly against the cam edge, the lever thus acting somewhat both as an actuating and as a locking pawl for positioning the plate and the thermostatic bars at proper adjustment.

For setting the slice support at supporting position simultaneously with the adjustment of the thermostat system as described, there is provided on the shaft, 36, at the opposite side of the thermostat-carrying plate from the cam, 41, a second triangular cam plate, 45, formed with blunted angles, as seen at 45ª, this cam being in the vertical plane of the latch bar, 28, and the under edge of that bar being formed for cooperating with the blunted cam angles of the cam plate, 45, as seen in the slight protrusion, 28ª, with which the blunt angles, 45ª, of the cam cooperate for lifting the lever, 28, the proper distance for causing the rack, 30, engaging the pinion, 26, on the slice support lever arm at its pivot, to swing the slice support up to supporting position.

The cam plate, 45, is positioned on the shaft, 36, with its blunt angles alternating in circumferential order with the angles of the plate, 41, for causing the angle, 45ª, to pass the protrusion, 28ª, leaving the lever latched as described, in the slice supporting position, substantially at the same time the corresponding angle of the cam plate, 41, is passing the point of the direct reaction of the lever, 38, on it; so that the cam plate, 45, will be free from the lever, 38, at the stage in the rotation of the shaft and cams at which the stress of the lever, 28, by the spring, 39, on the cam plate, 41, operates to snap that cam plate around through the remaining angle for bringing the lever, 38, flat against the flat edge of the cam.

The lever, 38, and the stretched spring, 39, for stressing the lever against the cam plate, are mounted on a plate, 42, which is mounted rotatably on a shaft, 36, and held in fixed position by the engagement of a segment rack, 42ª, formed at one end of the plate, with the gear, 44, having shaft, 43, journaled in the housing walls, 35 and 21, and protruding from the wall, 35, and arranged to receive a knob for manual operation as hereinafter described; and the spring locking dog, 46, is provided mounted on the housing end wall, having its nose engaged with the teeth of the gear, 44, for holding the latter and thereby the plate, 42, stably in adjusted position.

The purpose of providing this adjustable mounting for the pawl lever, 38, which has the function defined, of determining the position at which the thermostatic bars stand when the rotation of the system is automatically halted by the pawl lever, is that the amount of movement of the free end of the thermostatic bar necessary for its encounter with and actuation of a trip lever to release the slice support (and open the circuit, as hereinafter described) may be varied according to the required duration of heat treatment, which depends upon the effectiveness of the heat units for their function of heating, and also upon the degree of heat treatments which it is desired to give the article being treated, as in case of toast for toasting lightly or thoroughly.

The circuit in which the heat units are energized is indicated diagrammatically, the in-leading wire, 50, from the current source being connected to a binding post, 51, mounted insulatedly on the housing, on which there is mounted also alongside the post, 51, an insulated binding post, 52, with wires, 53, 53, extending thence in parallel for connection respectively with the resistance coils indicated at 54, 54, of the front and rear heat units respectively, from the opposite ends of which resistance coils the return circuit wires, 53ª, extend to the current source.

The circuit is completed between the binding posts, 51 and 52, by a conductive bridge piece, 57, mounted insulatedly on the lower end of a link, 58, which is connected, as seen at 59, at its upper end with the lever arm of the slice support at the opposite end from that at which the pinion, 26, is mounted, the construction being thereby such that the operation for lifting the slice support to supporting position causes said conductive bridge member to be thrust down into contact with the binding posts, 51 and 52, for completing the circuit; and, on the other hand, the release of the slice support by the thermostatic means described, causing the support to fall, causes the bridge piece to be lifted out of contact with said binding posts for interrupting the circuit.

For releasing the slice holder and terminating the heat treatment independently of the automatic thermostatic means described, on the wall plate, 35, by means of a short shaft, 62, journaled in said wall plate and protruding therefrom and arranged to be provided with an operating knob as hereinafter described, there is mounted a short rocker, 63, the upper end of which is arranged to swing into encounter with the lower end of the depending arm of the trip lever; which causes the catch nose, which engages the lug 34, for locking the slice support at operative position to be released, and thereby releasing the slice holder. For limiting the movement of the rocker to the short distance necessary for its function as described, its lower end has a notch, 63ª, which engages a stop pin, 64, set in the plate, 35, the arcuate extent of the notch being suitable for the desired movement of the rocker for its function as described.

For checking the slice exposed between the heat units, preventing it from leaning into contact with either unit, and, on the contrary, holding it equally distant from both, there are provided at short intervals in the length of the heat units narrow flat bars, 77, in two series, equally spaced respectively from the front and rear units, said pairs of the two series being engaged at their lower ends with the upper edges of the front and rear supports, 21, 21, respectively, and at their upper ends with the upper edges of the heat unit respectively, said pairs having for the latter engagement outwardly extending lugs, 77ª, at their upper ends notched on the under edge for engaging the edge of the heat unit, as mentioned.

Figure 1:
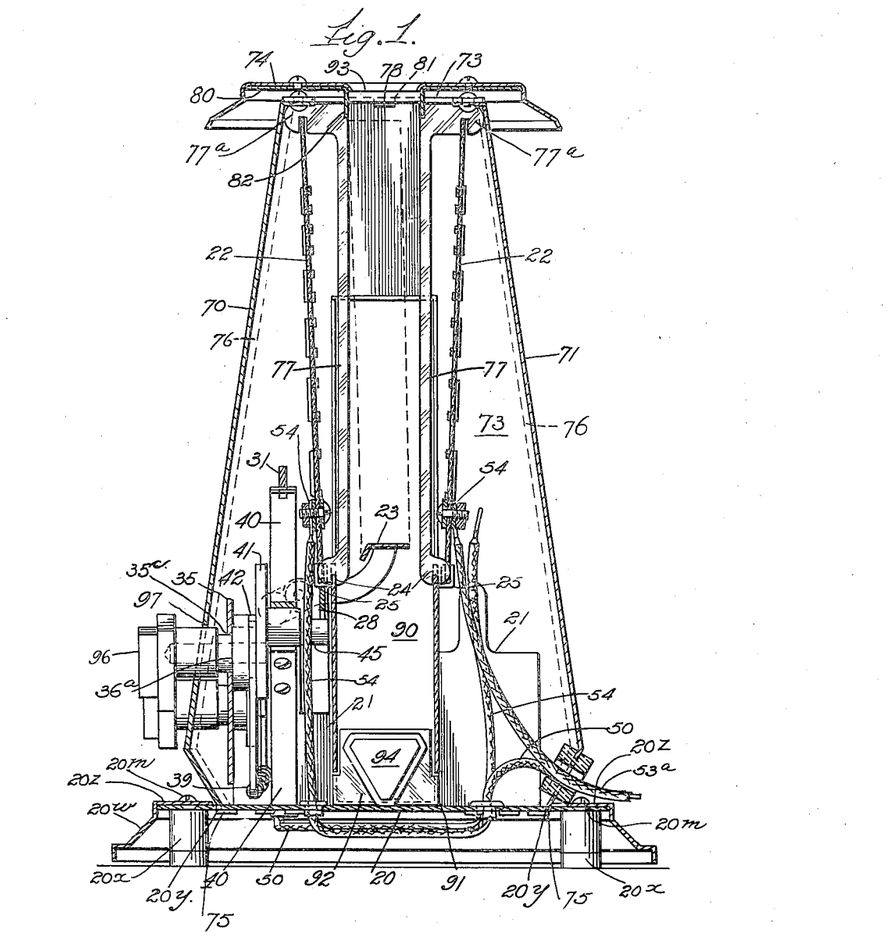
Figure 1 is a vertical fore-and-aft section of an apparatus embodying this invention.
Figure 2:
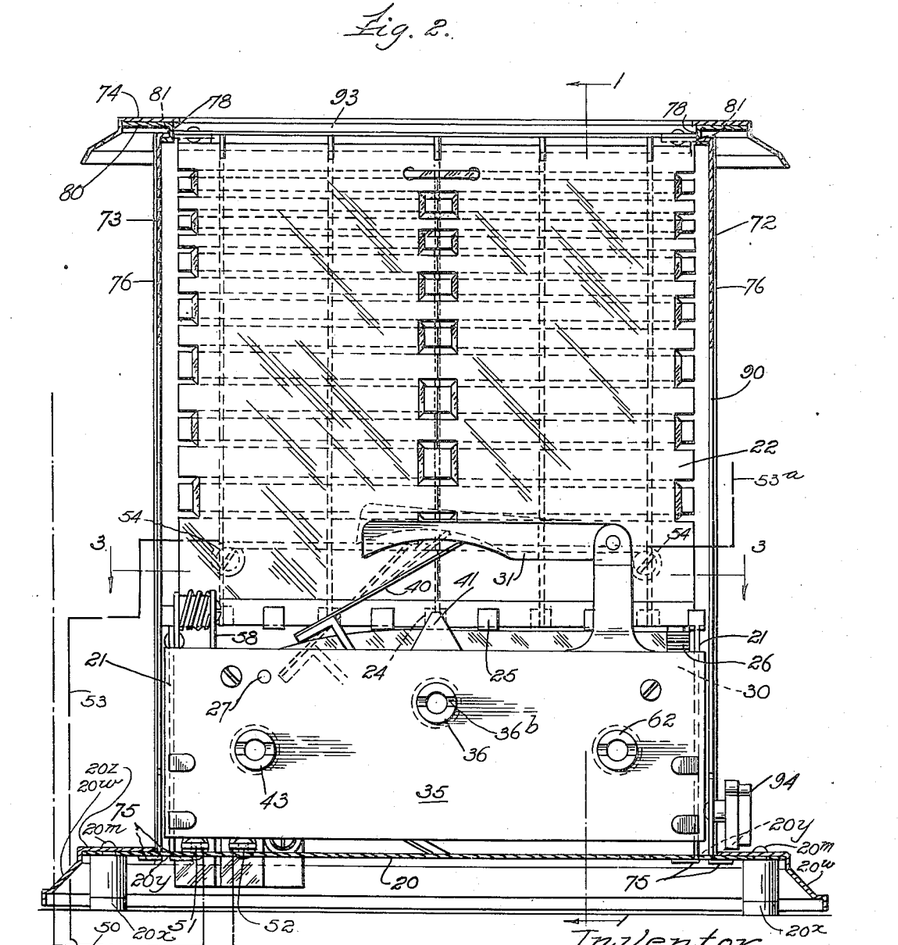
Figure 2 is a horizontal section at the plane indicated by the line 2—2 on Figure 1 with certain casing parts removed.
Figure 3:
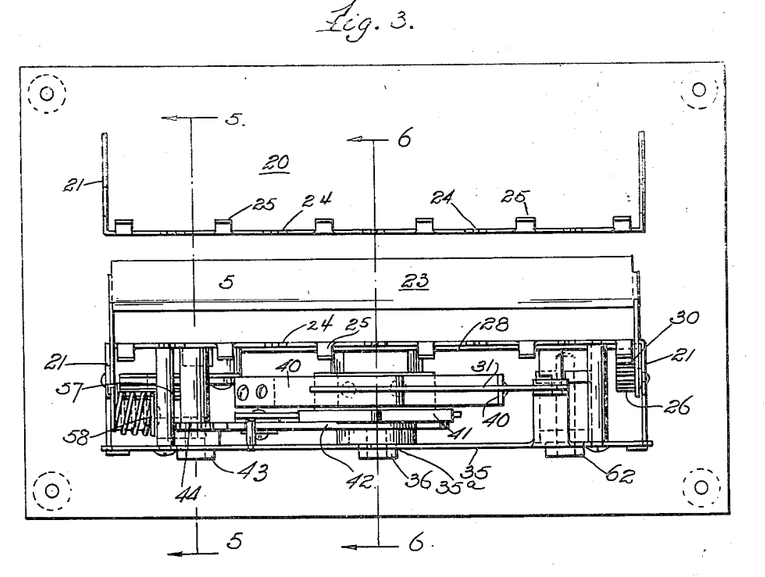
Figure 3 is a section at the line 3—3 on Figure 2.
Figure 4:
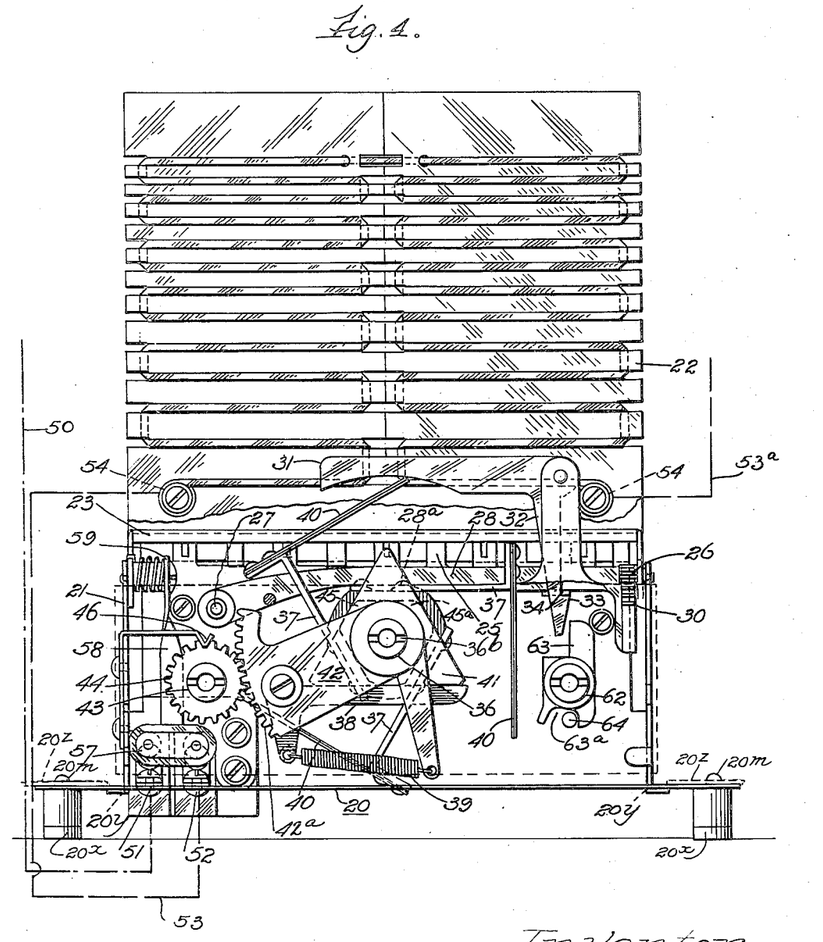
Figure 4 is a front elevation with front casing parts removed.

An enclosing shell for the entire structure as thus far described comprises a front plate, 70, a back plate, 71, right hand end plate, 72, and left hand end plate, 73, and a cap or top plate, 74. The four upright parts, front, back and end plates of the shell, are adapted to be assembled on the base plate, 20, lodged on the marginal area thereof, with which the base plate is provided for that purpose, said marginal area having at suitable points in the length of the base plate, slots, 20ʸ, for engagement of lugs, 75, formed at the bottom of the front and back plates and end plates, said lugs being adapted to be flexed inwardly for clinching them on the under side of the base plate; and the end plates are engaged with the front and back plates by means of inturned flanges, 76, on the vertical edges of the front and back plates embracing the end plates, as indicated in Figures 1 and 2. The cap or top plate, 80, is then applied over the assembly of the upright plates and engaged therewith by means of lugs, 78, struck from the cap plate downwardly for engaging slots, 81, formed in inturned flanges, 82, provided at the upper end of the end plates.

The base plate, 52, is provided with feet, 20ˣ, at the four corners; and the finishing curtain member, 20ʷ, corresponding in design to the cap plate, 74, is provided upheld by means of its inwardly extending horizontal flanges, 20ᶻ, lodged above the base plate on the margin of the latter, and secured by screws, 20ᵐ, which secure the feet, 20ˣ.

For completing the assembly and securing the cap plate, the latter is bolted securely to the upright plates of the enclosing shell, as indicated by the bolts, 85, engaging suitable inwardly projecting lugs, 86, on said shell members.

Figure 6:
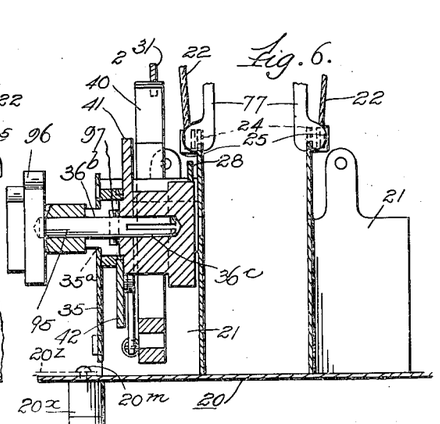
Figure 6 is a section at the line 6—6 on Figure 5.

The right hand end plate has a vertically extended opening, 90, approximately equal in width to the space between the two heat units; and there is provided on the base plate immediately below said spaces a slideway, 91, for a sliding carrier, 92, which receives the slice released from heat treatment by the withdrawal of the support, 23; and said slide carrier has a handle, 94, for withdrawing the slide manually to remove the toasted slice preparatory to replacing the slice support, 23, in position for holding the next slice in heat treatment position; and the cap or top plate, 74, has a slot, 93, directly above the space between the heat units for admitting a fresh slice to lodge on the support, 23, for exposure to the heat units for toasting. The front plate, 70, of the enclosing shell has apertures, 96, 97 and 98 registering respectively with the inthrust ends of the shafts, 36, 43 and 62, respectively, for admitting operating knobs to engage said shafts, the construction in detail for this purpose being identical in all three shafts and knobs as will now be described by reference to one of them, as seen in Figure 6.

The shaft, 36, is selected for this description. It is reduced in diameter at the end to fit the aperture, 35ᶜ, in the front plate, 37, and to form a shoulder, 36ᵃ, against which the front plate, 35, is stopped. The protruding end of the shaft is slotted, as seen at 36ᵇ, and axially bored, as seen at 36ᶜ, to admit the spindle, 95, of the knob, 96, said spindle being split at the inner end and normally slightly spread so as to react for frictional engagement in the axial bore, 36ᶜ, of the shaft, and the stem of the knob is furnished with a cross pin, 97, whose projecting ends engage the slot, 36ᵇ, for rotating the shaft.

The knob, 96, is furnished at its front side with a triangular boss, 96ᵃ, corresponding in position to the triangular cam, 41, thus affording the operator visual indication of the position of said cam for his guidance in making adjutment. As a matter of economy and convenience, all three knobs are identical in form and dimensions so that they are interchangeable, and the boss, 96ᵃ, accordingly appears upon all of them though having no function except in the case of the knob operating the shaft, 36.

I claim:

1. In an apparatus for the purpose indicated comprising a heat unit and a holder for a substance to be heat treated, temperature-responsive means positioned in exposure to the heat unit and associated with the holder in a manner controlling the position of the latter and thereby controlling the exposure of the treated article to the heat unit for heat treatment, said temperature-responsive means comprising a plurality of separate temperature-responsive members, each integral, independent of the heat-treated article, and manually operable means for adjusting them to position them each in succession in repeated exposure alternately to the heat unit and in position for cooling.

2. In an apparatus for the purpose indicated comprising a heat unit, and means for positioning an article to be heat treated in exposure to said heat unit: temperature-responsive means positioned in exposure to the heat unit and cooperating with the first mentioned means in controlling the exposure of the article to the heat unit for heat treatment thereby, said temperature-responsive means comprising a pluraliy of temperature-responsive members, each integral, independent of the heat treated article, and means for adjusting them to position them each in succession in repeated exposure alternately to the heat unit and in position for cooling.

3. In an apparatus for the purpose indicated comprising a heat unit, heating means therefor, and controlling means for said heating means, means for positioning an article to be heat treated in exposure to said heat unit; temperature responsive means independent of the heat-treated article positioned in exposure to the heat unit for responding to the temperature of the latter and by said response controlling the exposure of said article to the heat unit for heat treatment, thereby, said temperature responsive means comprising a plurality of separate temperature responsive members each integral and means for adjusting them to position them each in succession in repeated exposure alternately to the heat unit and in position for cooling, and operating connections from said adjusting means for operating the means which control the heating means.

4. In an apparatus for the purpose indicated comprising a heat unit, heating means therefor, and controlling means for said heating means, means for positioning an article to be heat-treated in exposure to said heat unit; temperature responsive means independent of the heat treated article exposed to the heat unit for responding to the temperature of the latter and by said response controlling the exposure of said article to the heat unit for heat treatment thereby, means for adjusting the temperature-responsive means to locate it repeatedly in entirety alternately in position to be heated and in position to be cooled, and operating connections from said adjusting means for operating the means controlling the heating means.

5. In an apparatus for the purpose indicated comprising an electric heat unit and an electric circuit in which it is energized, switch means for controlling said circuit; means for positioning an article to be heat treated in exposure to the heat unit; temperature responsive means independent of the heat-treated article and means by which it is carried for movement into and out of exposure to the heat unit for responding to the temperature of the latter, and by said response controlling the exposure of said substance to the heat unit for heat treatment thereby, means for operating said carry means to shift the temperature-responsive means to locate it repeatedly in entirety alternately in position to be heated and in position to be cooled, and operating connections from the article-positioning means for operating the switch means.

6. In an apparatus for the purpose indicated comprising a heat unit and heating means for the same, means controlling said heating means; means for positioning an article to be heat treated in exposure to the heat unit; temperature responsive means independent of the heat-treated article exposed to the heat unit for responding to the temperature of the latter, and by said response controlling the exposure of said substance to the heat unit for heat treatment thereby, means for adjusting the temperature responsive means to locate it repeatedly in entirety alternately in position to be treated and in position to be cooled, and operating connections from the article-positioning means for operating the means controlling the heating means.

7. In an apparatus for the purpose indicated comprising an electric heat unit and an electric circuit in which it is energized, switch means for controlling said circuit; means for positioning an article to be heat treated in exposure to the heat unit; temperature responsive means independent of the heat treated article positioned in exposure to the heat unit for responding to the temperature of the latter, and by said response controlling the exposure of said substance to the heat unit for heat treatment thereby, said temperature responsive means comprising a plurality of separate temperature responsive members each integral, and means for adjusting them to position them each in succession in repeated exposure alternately to the heat unit and in cooling position, and operating connections from the article-positioning means for operating the switch means.

8. A heat treatment apparatus comprising a heat unit and means associated therewith for removably supporting an article to be heat treated in exposure to the heat unit, said supporting means being normally out of supporting position, means for engaging it in supporting position; means operating said engaging means for releasing the supporting means to permit its automatic return to its normal non-supporting position; separate temperature responsive means in plurality each integral independent of the heat-treated article, and carry-means for the same for carrying the several temperature-responsive means each in succession in repeated exposure to the heat treatment means, and holding them severally in the intervals of said exposure in position for cooling, said temperature-responsive means, when at position of exposure to heat treatment means, being associated with said releasing means for operating the latter for releasing the supporting means by the movement of said temperature-responsive means responsive to rise of temperature during said exposure.

9. In an apparatus for the purpose indicated comprising a heat unit and a holder for a substance to be heat treated, temperature responsive means independent of the heat-treated substance, means by which it is carried for movement into and out of exposure to the heat unit for responding to the temperature of the latter and controlling the position of the holder; means operating said carrying means to shift the temperature-responsive means into and out of position of exposure to the heat unit; an electric circuit in which the heat unit is energized, having a gap; a conductive element adapted to span the gap for closing the circuit, said element being carried insulatedly by said holder and movable thereby for lodgment in gap-spanning position by the movement of said holder into position for holding the heat treated article in heat treatment position.

10. In an apparatus for the purpose indicated comprising a heat unit and a holder for a substance to be heat-treated, temperature-responsive means independent of the heat-treated substance, means by which it is carried for movement into and out of exposure to the heat unit for responding to the temperature of the latter, and constructed and associated with the holder in a manner controlling the holder for controlling the exposure of the treated substance to the heat unit for heat treatment, means for operating said carrying means to shift the temperature-responsive means into and out of position of exposure to the heat unit, an electric circuit in which the heat unit is energized, and circuit-controlling means operated for closing the circuit by the movement of the holder into operative position for holding the treated substance in heat treatment position.

11. In an apparatus for the purpose indicated comprising a heat unit and a holder for a substance to be heat-treated, temperature-responsive means independent of the heat-treated substance positioned in exposure to the heat unit for responding to the temperature of the latter, and constructed and associated with the holder in a manner controlling the holder for controlling the exposure of the treated substance to the heat unit for heat treatment, means for shifting the temperature-responsive means repeatedly and in entirety alternately into position of exposure to the heat unit and into position for cooling in the intervals between exposures to heat, an electric circuit in which the heat unit is energized, and circuit-controlling means operated for opening the circuit by the movement of the holder for releasing the substance from heat-treatment position.

12. In an apparatus for the purpose indicated comprising a heat unit and a holder for a substance to be heat-treated, temperature-responsive means independent of the heat-treated substance; means by which it is carried for movement into and out of exposure to the heat unit for responding to the temperature of the latter, said means constructed and associated with the holder in a manner controlling the holder for controlling the exposure of the treated substance to the heat unit for heat treatment, means for shifting the temperature-responsive means operating said carrying means to shift the temperature-responsive means alternately into position of exposure, means for controlling said heating means, and connections by which the last mentioned means is operated for interrupting the heating by the movement of the holder for terminating the exposure of the substance to the heat unit.

13. In combination with an electric heating element, a circuit for said heating element, switch mechanism in said circuit that is normally under strain to move to an open position, and means for supporting material to be heated in proper relation to said heating element, a plurality of heat-responsive latch devices each including a heat-responsive element, said latch devices being operative successively and repeatedly on said switch mechanism, the heat-responsive element of an operative latch being subject to heat from the heating element and responsive thereto to trip the switch and permit the same to move to an open position, and the heat-responsive element of an inoperative latch being in a cooling position remote from the heating element.

14. An apparatus for the purpose indicated comprising in combination a heating means and a support for holding material to be heated within heating range of said heating means, said support constructed and arranged to be withdrawn from supporting position by gravity to permit the supported material to be moved from heating position; means releasably holding said support in said material-supporting position; a plurality of heat-responsive releasing members arranged to occupy successively and repeatedly one at a time position for operating on said support-holding means for releasing the same to permit the support to withdraw from material-supporting position, the releasing member at any time in operative position being there exposed to heat from the heating means and being responsive thereto by movement releasing the support-holding means, the several heat-responsive members being mounted on carrying-means-in-common, said carrying means being arranged for adjustment carrying the other heat-responsive members into cooling position remote from the heating means when one of said members is carried into heating position.

15. In combination with a device normally under stress and tending to move to perform a function, mechanical means arranged to lock said device against the function-performing movement; a heating means; a plurality of heat-responsive elements arranged to be successively and repeatedly one at a time positioned for cooperating with the locking means to cause the latter to release the device for its function-performing movement, the cooperating action of the heat-responsive element consisting in its movement in response to heating, the cooperatively positioned element at said cooperating position being exposed to the heating means and responsive thereto by said cooperating movement, the other of said plurality of heat-responsive elements being mounted for shifting their position in a circuit arranged so that when one of said elements is in position exposed to heating means another of said elements is in a cooling position remote from the heating means.

16. In a toaster having a heating element, a support for holding a bread slice in close relation to said heating element, said support being arranged tending normally to withdraw from bread-supporting position; releasable locking means holding the support in bread-holding position against the tendency to withdraw; means for releasing said locking means consisting of a plurality of heat-responsive elements mounted for movements-in-common to locate them successively, one at a time, in position for operating on the locking means for release thereof, the heat-responsive element which is at a given time in operative position being in that position exposed to the heat of the heating element, said heat-responsive elements being each formed to operate for release of the locking means by movement responsive to predetermined amount of heat.

17. In a toaster having a heating element, a support for holding a bread slice in toasting relation to the heating element; means for locking the support in bread-holding position, and means for releasing the locking means to permit the delivery of the toast; a heat-responsive device and a mount on which the same is carried bodily into and out of position of exposure to the heating element, and into and out of operative relation to the releasing means, said heat-responsive device being formed and arranged for operating the releasing means by automatic movement of said heat-responsive device upon being heated to a predetermined amount; means associated with the bread support for restoring it to bread-supporting position comprising an operating member operatively associated with the means by which the heat-responsive element is carried bodily for actuation by said means in the direction for restoring the bread support by the movement of said heat-responsive-device-mount in the movement of said mount for carrying the heat-responsive element out of operative position.

18. In combination with a heat treatment chamber, means holding material to be heat treated in the chamber for a timed period and operable for its removal at the limit of the timed period; a plurality of heat-responsive elements and a mount and carrier for said elements by which they are carried in movement-in-common; a heating element; the heat-responsive element and the mount and carrier thereof being arranged for positioning said elements successively one at a time in exposure to the heating element; means by which the material-holding means is controlled for removal of the material from heat treatment position in the heat chamber constructed and arranged to be operated for effecting such removal by the heat-responsive movement of the heat-responsive element which is exposed to the heating element, and means for actuating said mount and carrier to transpose the heat-responsive elements by movement one out of and the other into position of exposure to the heating element.

19. The construction defined in claim 16, mounting means for the heat-responsive elements arranged to carrying them all together in the movement for adjusting them successively to operative position and exposure to the heating element, said heat-responsive elements being associated with said mounting means so that the movement which carries one of said elements into operative and heating position carries the other of said elements into cooling position remote from the heating element.

20. In combination with a device normally under stress for movement to perform a function, and locking means opposing the function-performing movement, releasing means for said locking means; a heating element; a plurality of heat-responsive elements mounted for movement-in-common to position them each successively one at a time in exposure to the heating element and position the remainder in cooling position away from the heating element, said heat-responsive elements being formed and arranged so that each of them when in the position of exposure to the heating element by its heat-responsive movement operates said releasing means.

In testimony whereof, I have hereunto set my hand at Chicago, Illinois, this 28th day of April, 1930.

GEORGE BROWNING.